United States Patent [19]

Marino

[11] Patent Number: 5,443,038
[45] Date of Patent: Aug. 22, 1995

[54] ADAPTABLE PET GUIDE ASSEMBLY

[76] Inventor: Frank Marino, 9 Hazeltine Rd., Upton, Mass. 01568

[21] Appl. No.: 321,005

[22] Filed: Oct. 11, 1994

[51] Int. Cl.⁶ .............................................. A01K 27/00
[52] U.S. Cl. ..................................... 119/784; 119/797
[58] Field of Search ............... 119/784, 785, 795, 771, 119/792, 797; 24/265 R, 115 H

[56] References Cited

U.S. PATENT DOCUMENTS

| | | | |
|---|---|---|---|
| 1,563,212 | 11/1925 | Madiar | 119/284 |
| 2,909,154 | 10/1959 | Thomas | 119/771 |
| 3,648,664 | 3/1972 | Nunley | 119/784 |
| 3,678,903 | 7/1972 | Ferraro | 119/784 |
| 4,252,084 | 2/1981 | Willow | 119/771 |
| 4,763,609 | 8/1988 | Kulik | 119/797 |
| 4,879,972 | 11/1989 | Crowe et al. | 119/792 |
| 5,003,929 | 4/1991 | Dean | 119/784 |

FOREIGN PATENT DOCUMENTS

381541  1/1908  France ................................ 119/784

Primary Examiner—Todd E. Mancha
Attorney, Agent, or Firm—F. Marino

[57] ABSTRACT

A restraining device for allowing a pet to encircle a building or the like has a continuous cable looped around the building and a leash movably engaging the cable and fixedly attached to the pet so that the pet may pull the leash along the cable and around the building. A connector freely moveable along the cable allows the length of the loop to be adjusted prior to use.

2 Claims, 16 Drawing Sheets

ADAPTABLE PET GUIDE ASSEMBLY

BACKGROUND OF THE INVENTION

The present invention relates to "pet runs", which are used to restrain pets, most commonly dogs, allowing the pet some freedom to move about and guard a property while keeping within a certain area defined by the reach of the run.

Presently marketed runs consist of several varieties. One system consists of a spring loaded leash mechanism stored within a housing so as to maintain a retracting force as the pet approaches or leaves the area of the housing. The housing could be affixed to a home, to a nearby tree, or to some other permanent fixture and the pet has freedom to roam within a circular area defined by the reach of the extended leash from the housing. This system has somewhat limited applications due to the limitations of self loading retracting springs and due to the constant force being exerted on the pet's collar as the spring is extended. This system is therefor practical only when the pet requires access to a small circular area.

Another system consists of a cable portion affixed between two trees or such and suspended above ground with a leash portion movably attached at one end to the cable and removably attached at the other end to the pet so as to allow the pet to move in a basically straight line, back and forth along the length of the cable. The area accessible by the pet is limited by the reach of the leash from the cable. The reach of the leash from the cable is reduced as the cable is suspended higher off the ground. It is preferable to suspend the cable high enough to allow humans unobstructed passing below - for obvious safety and convenience reasons. This system is therefore practical only in situations where the pet requires access to a long thin area and trees or such are conveniently located.

A similar system consists of a cable portion staked at both ends into the ground with a similar leash portion as previously described. Although this is preferable in properties where trees or such are not conveniently located for mounting the cable and this system allows for a slightly longer reach by the leash due to the lower positioning of the cable, this presents alternate safety and convenience problems as the stakes can be easily tripped over, cause obstruction during lawn mowing, cause entanglement of the leash around the stakes, and do not provide much more than the same long thin area of service as the previous system.

A simplified conventional pet restraining system consists of a pet being tied to a tree or the like in which the rope which with the pet is tied is looped around the tree base. The pet is then free to circle the tree. The reach of the rope from the tree to the pet defines the circular area accessible to the pet. However, as the pet continues to circle the tree in the same rotational direction, the reach of the rope from the tree gets shorter and shorter as the rope wraps around the tree.

It is the object of the present invention to provide a pet run system which overcomes the above limitations while allowing the pet access to the entire area encircling a building, thereby providing increased freedom for the pet and improved security for the building.

SUMMARY OF THE INVENTION

The present invention is a pet run system consisting of a cable portion adapted to connect at one end to its other end to form a continuous loop, with a conventional leash portion. The connection of the two ends of the cable is substantially unobstructive to the movement of the leash thereover. The cable ends can be adapted to allow additional identical cable sections to be enjoined in a modular fashion to thereby allow infinite increases in the loop length. The loop can thereby be positioned around a building, a home, a group of trees or shrubs or any combination thereof. The loop is allowed to rest on the ground. The connection of the loop ends is designed such that one end of the cable can be cut off to a suitable length for the particular application. The slackness or tautness of the loop around the structures it circumscribes can thereby be customized.

The cable is of a sufficiently heavy gauge that it can be passed over by a lawn mower without interference or entanglement.

The pet can be trained to follow the path of the cable and thereby avoid entanglement with other objects, such as trees, within reach of the leash. The cable resting on the ground creates no interference to automobiles entering and exiting a garage within the loop.

The cable is encased within a vinyl outer layer, so that it will not damage the bark of trees and shrubbery or the paint on a building as it is pulled or rubbed thereagainst.

By leaving the loop somewhat slack, it follows more closely the hills and valleys of the ground around the building, thereby avoiding a safety hazard from tripping thereover, yet in areas where a flat ground contour negates the need for this benefit, a more taught loop can provide a shock-absorbing effect as the pet running from the building reaches the limits of the run.

In an alternate embodiment of the invention, the leash is fixedly connected to both ends of the loop at the joining of the cable ends or at some other location on the loop. The pet can thereby circle the building while tugging the connection, thereby causing the entire loop to rotate about the building.

DESCRIPTION OF THE PREFERRED EMBODIMENT

The preferred embodiment of the improved pet run system is depicted in FIG. 1 through FIG. 12. It consists of a cable portion (20) including a line (21) and a connector (22), and a leash (23).

Figure 1:
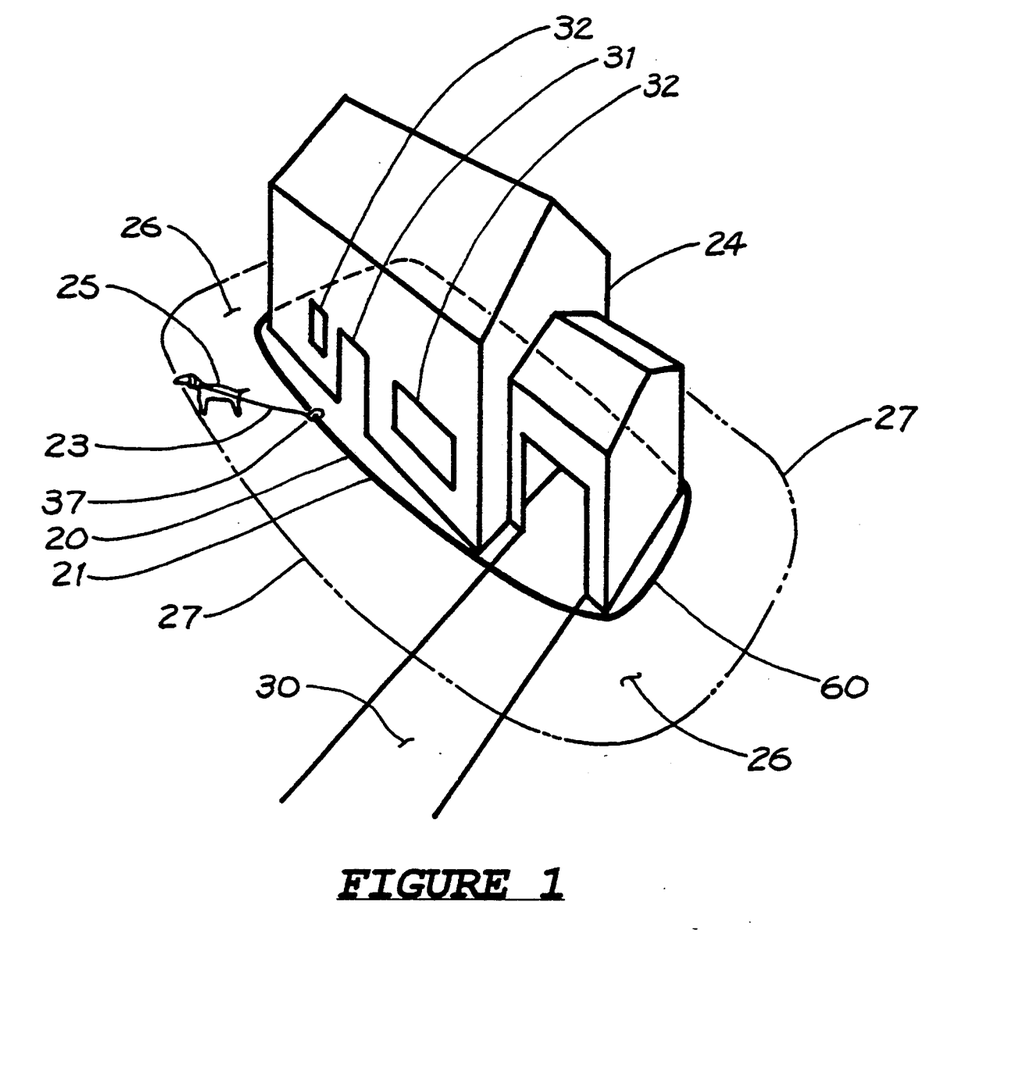
FIG. 1 is a perspective view of the preferred embodiment of the invention shown encircling a typical home.

In FIG. 1, the system is depicted encircling a typical home (24). The cable is substantially adjacent the periphery of the home and the pet (25) may wander throughout a larger area (26) of similar contour to the cable. The leash being approximately ten feet long, the area accessible to the pet is defined by a line (27) slightly more than ten feet from and around the entire home. The pet may pass across the driveway (30), the front door (31), the back door (not shown), and below all windows (32) to provide protection at all entrances of the home.

Figure 2:
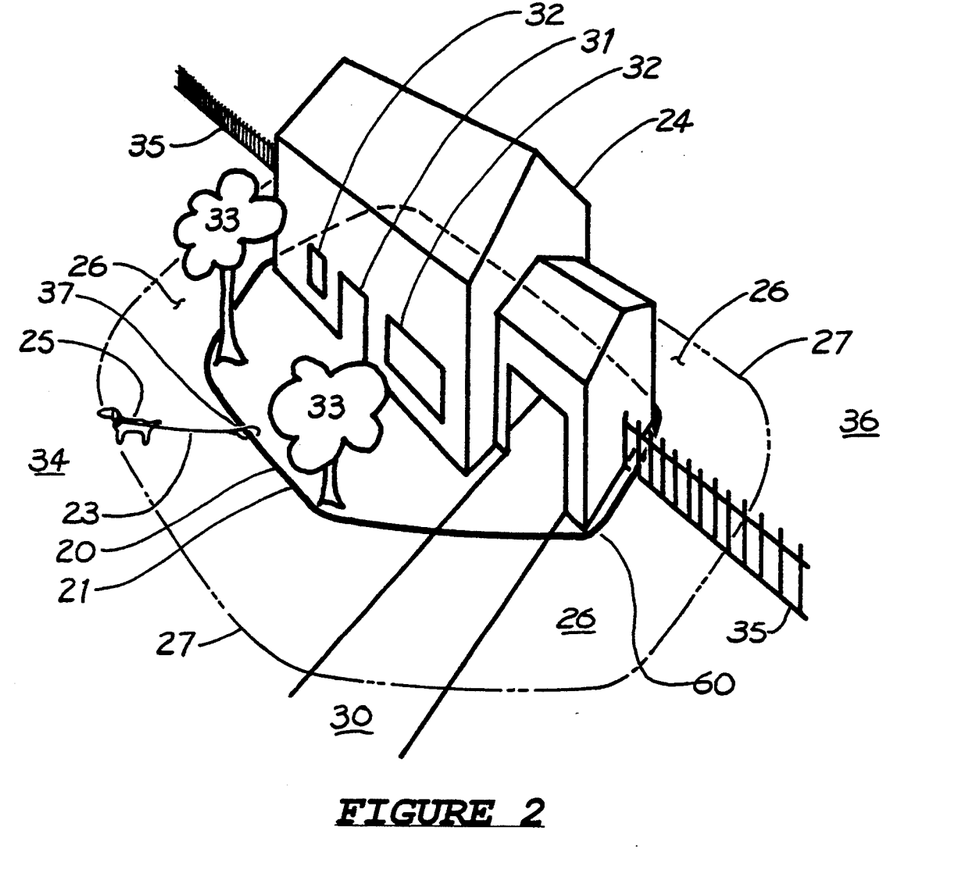
FIG. 2 is a perspective view of the embodiment of FIG. 1 encircling a home with trees and a fence.

A similar depiction is shown in FIG. 2 wherein the same home has trees (33) in the front yard (34) and a fence (35) separating the front and back (36) yards. The cable length must therefor be longer to surround the trees. The cable is passed through the fence on both ends of the home to full encircle the home and the trees. The leash may now be attached to the cable in either the front or back yard and allowed access therein. A second leash (not shown) could be attached in the back yard to allow two pets to simultaneously roam in each yard, or to put the pet in the front yard some times, and the back yard some other times.

Figure 3:
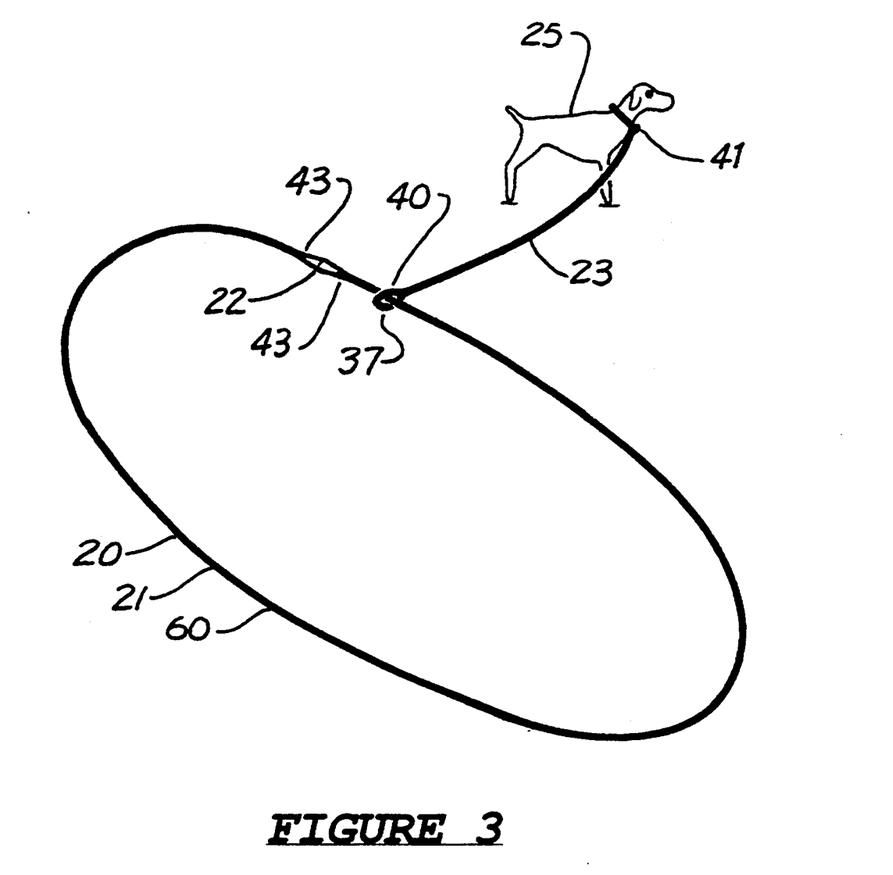
FIG. 3 is a perspective view of the embodiment of FIG. 1 showing only the invention and a typical pet.
Figure 4:
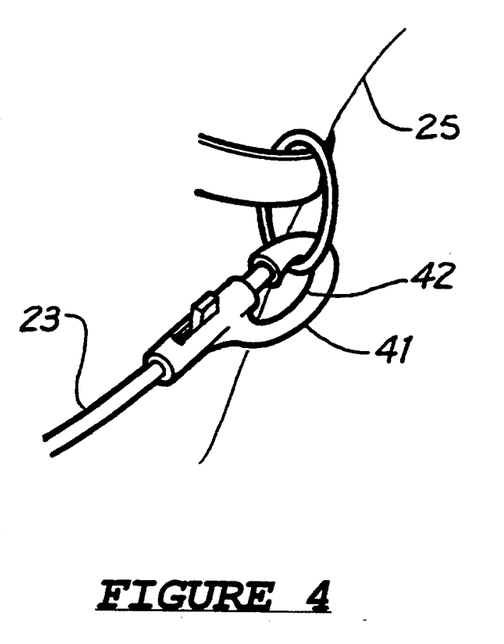
FIG. 4 is an enlarged view of the attachment of the leash of FIG. 3 to the pet.
Figure 5:
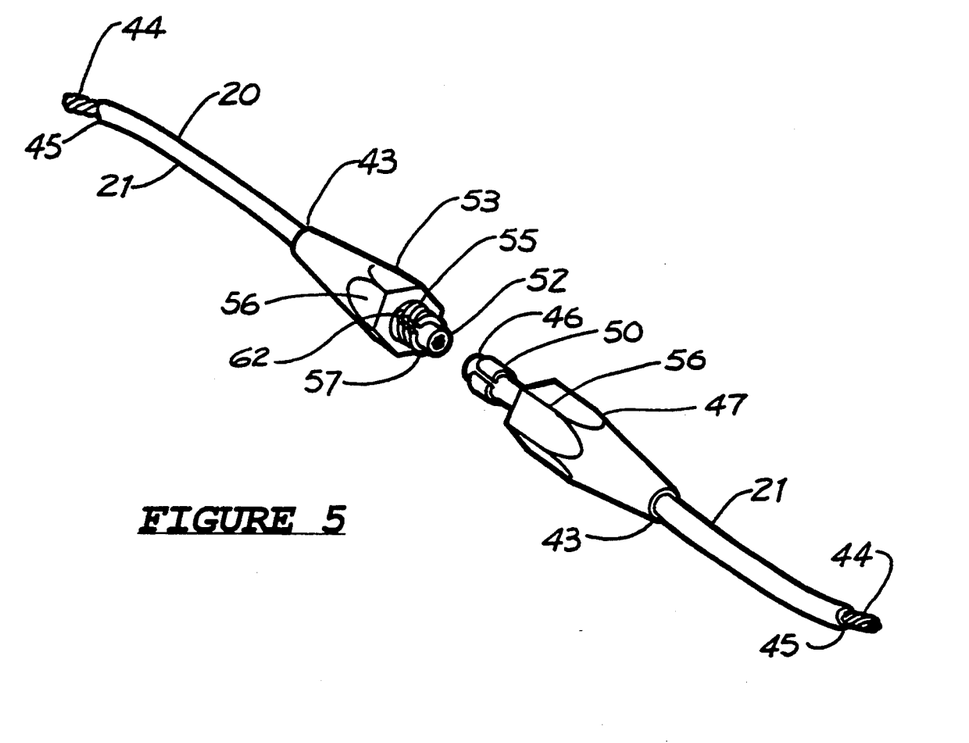
FIG. 5 is a partial perspective view showing the unconnected connector of the embodiment of FIG. 1.
Figure 6:
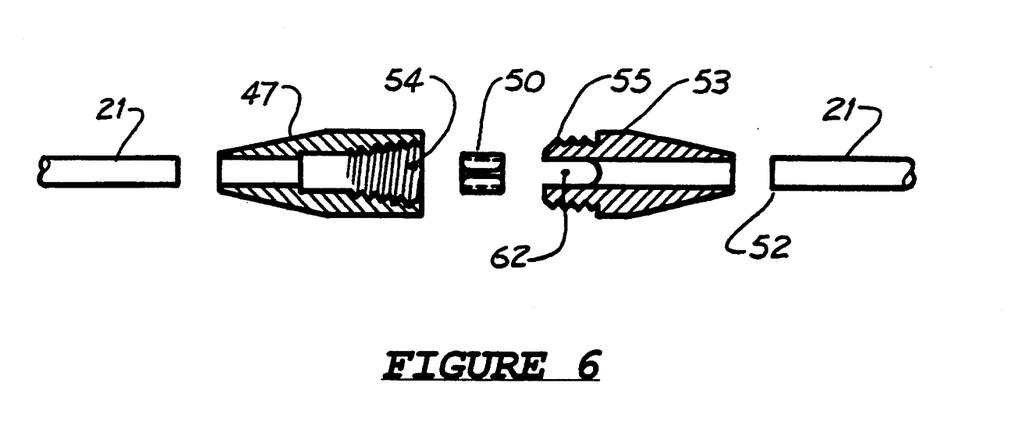
FIG. 6 is an exploded cross sectional view of the unassembled components of the connector of FIG. 5.
Figure 7:
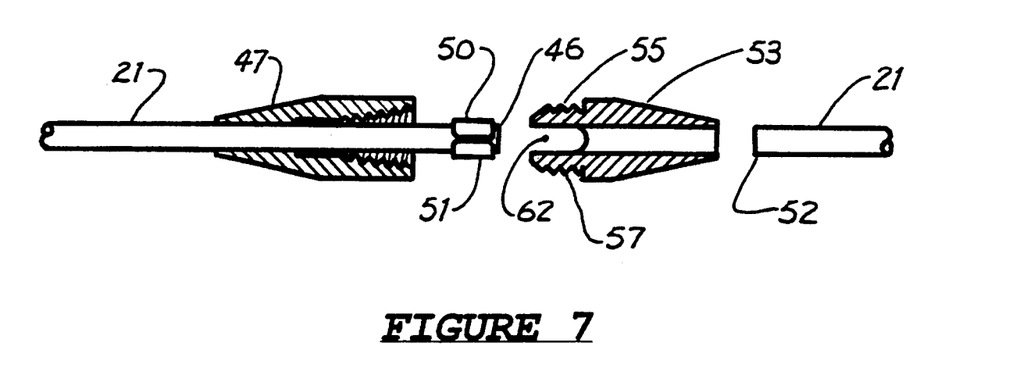
FIG. 7 is a cross sectional view of the connector of FIG. 5 wherein the ferrule has been crimped onto the cable.
Figure 8:
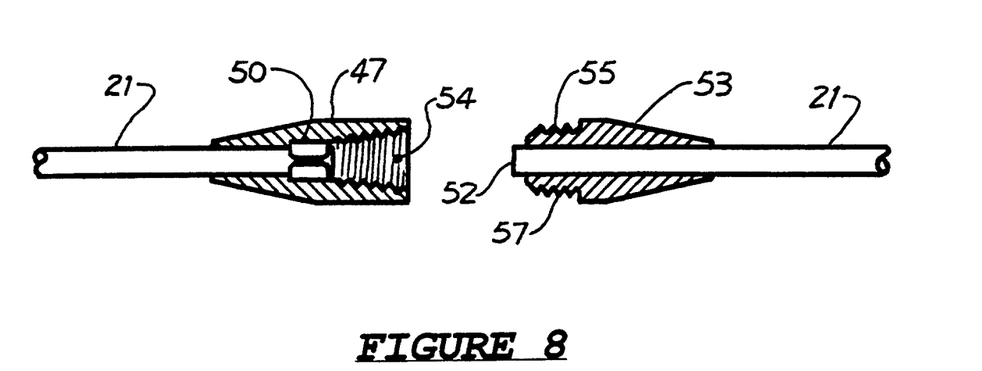
FIG. 8 is a cross sectional view of the unconnected connector of FIG. 5.
Figure 9:
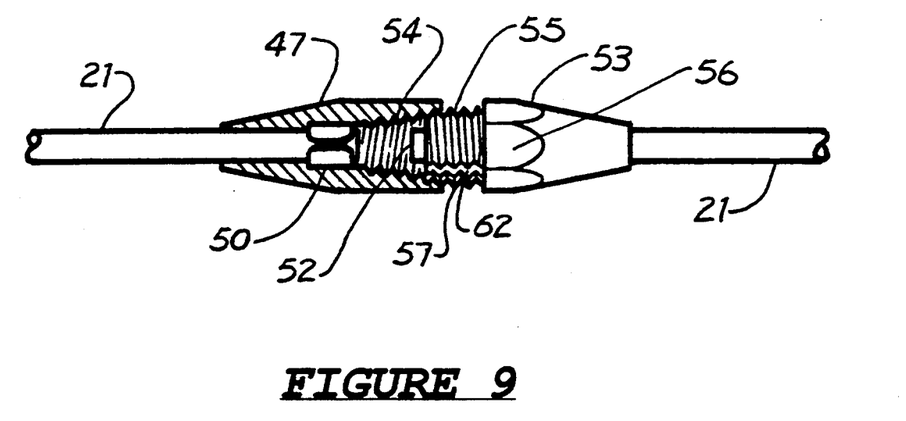
FIG. 9 is a partial cross sectional view of the partly connected connector of FIG. 5.

In the finally assembled state, shown in FIG. 3, a small loop (37) at the engagement end (40) of the leash rides over the cable line and the connector. The leash can be made of a variety of materials, including rope, cloth strap, or vinyl-coated steel cable. The leash is attached to the pet by a conventional removable clasp (41). The leash could, of course, engage the cable line by a similar clasp, provided the opening (42) through the clasp is sufficiently large enough to pass over the connector. The connector is tapered at both ends (43) to facilitate the smooth passing of the leash thereover.

The cable and connector construction and assembly is best understood by referral to FIGS. 5 through 11. The cable line is constructed of sixteen gauge stranded steel wire (44) encased in a vinyl coating (45) which is approximately one thirty-second of an inch thick. The outer diameter of the line is thereby approximately one eighth of an inch. The line would be originally provided to the user at a length longer than expectedly required, say one hundred and fifty feet. This would be more than sufficiently long enough to encircle a building forty feet long and thirty feet deep. Although a much shorter cable of only say forty feet in length would be useful in some applications, such as around a small shed or when sold in modular fashion allowing the user to customise the cable length by purchasing additional forty-foot cables.

One end (46) of the cable as provided has been fed through the female half (47) of the connector. That first cable end has a steel ferrule (50) crimped therearound to prevent removal back through that female connector half. The ferrule has a wall thickness of approximately one thirty-second of an inch so that after crimping, the outer diameter (51) of the ferrule is approximately three-sixteenths of an inch. The second cable end (52), intended to fit within the male connector half (53), has no ferrule. When the ferruled cable end is fully retracted into the female connector half, the female threaded hole (54) within is exposed and free to accept the male thread (55) of the male connector half. The connector halves are machined from hexagonally extruded aluminum rod stock, but could just as well be injection molded of plastic, such as nylon. It is important that the connector not be made of a material that will rust and lock together. The hexagonal outer surfaces (56) of each half may be grasped by wrenches (not shown) during assembly.

The user would first feed either cable end through the small loop of the leash, then lie the line around the home along the intended path until the second cable end overlaps the first. The user would then truncate the second end, leaving an inch or so of extra length. The female connector half would then be slid over the truncated second cable end allowing approximately one-eighth of an inch to extend beyond the male threaded extension (57). The two cable halves would then be threaded together to complete the cable assembly (60). The female threaded hole of the female connector half is tapered, like a pipe thread. The male threaded extension of the male connector half is not tapered, but includes a slot (62) allowing the extension to collapse as it is tightened into the female half, thereby clamping onto and securing the second cable end within.

Figure 10:
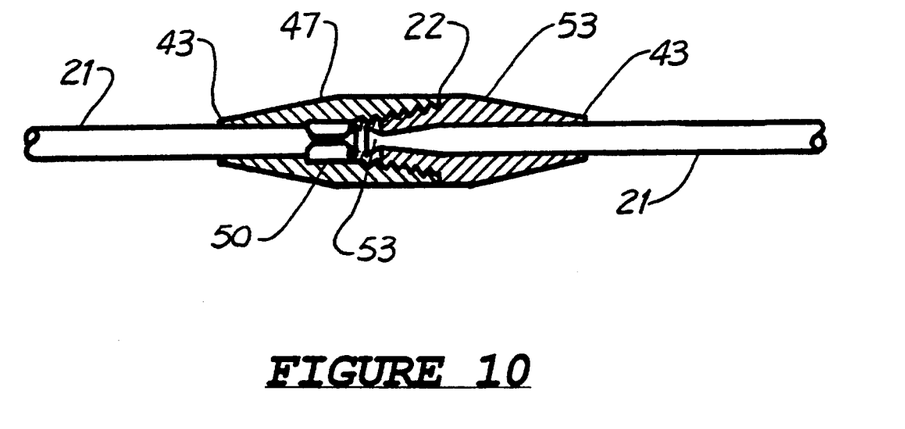
FIG. 10 is a cross sectional view of the fully connected connector of FIG. 5.
Figure 11:
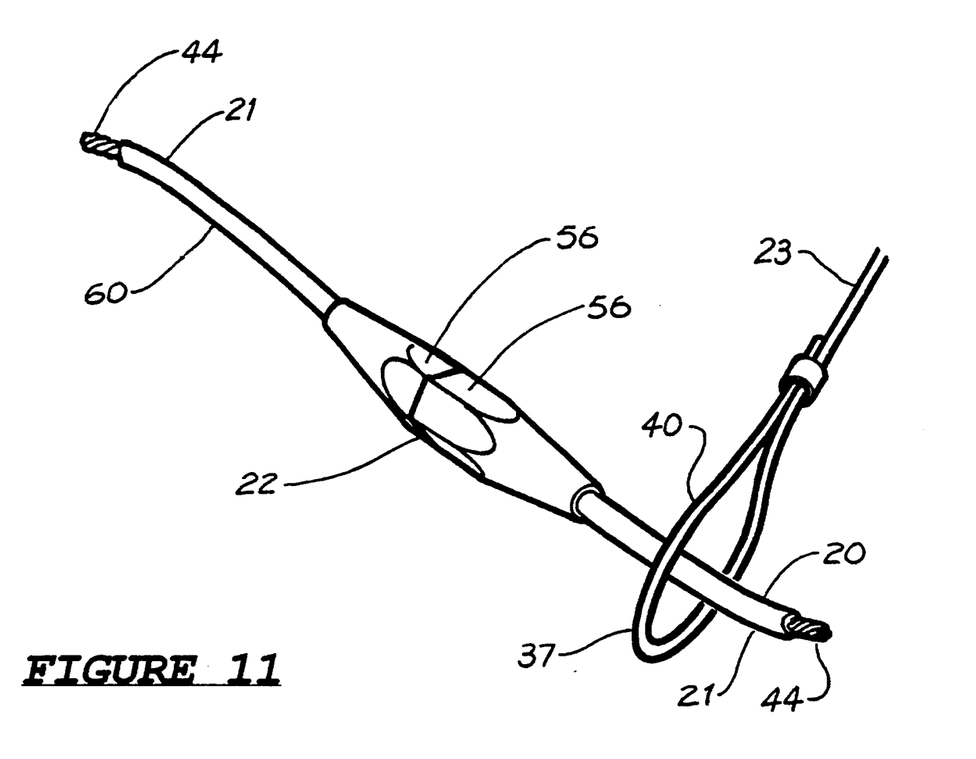
FIG. 11 is a partial perspective view of the connected connector of FIG. 5 showing also a partial view of the leash portion.

The assembled connector has a maximum height, measured across opposing hexagon peaks, of approximately three-eighths of an inch. The small loop of the leash has a minimum opening within of approximately one inch. The leash loop is easily pulled back and forth by the pet over the connector without obstruction.

Figure 12:
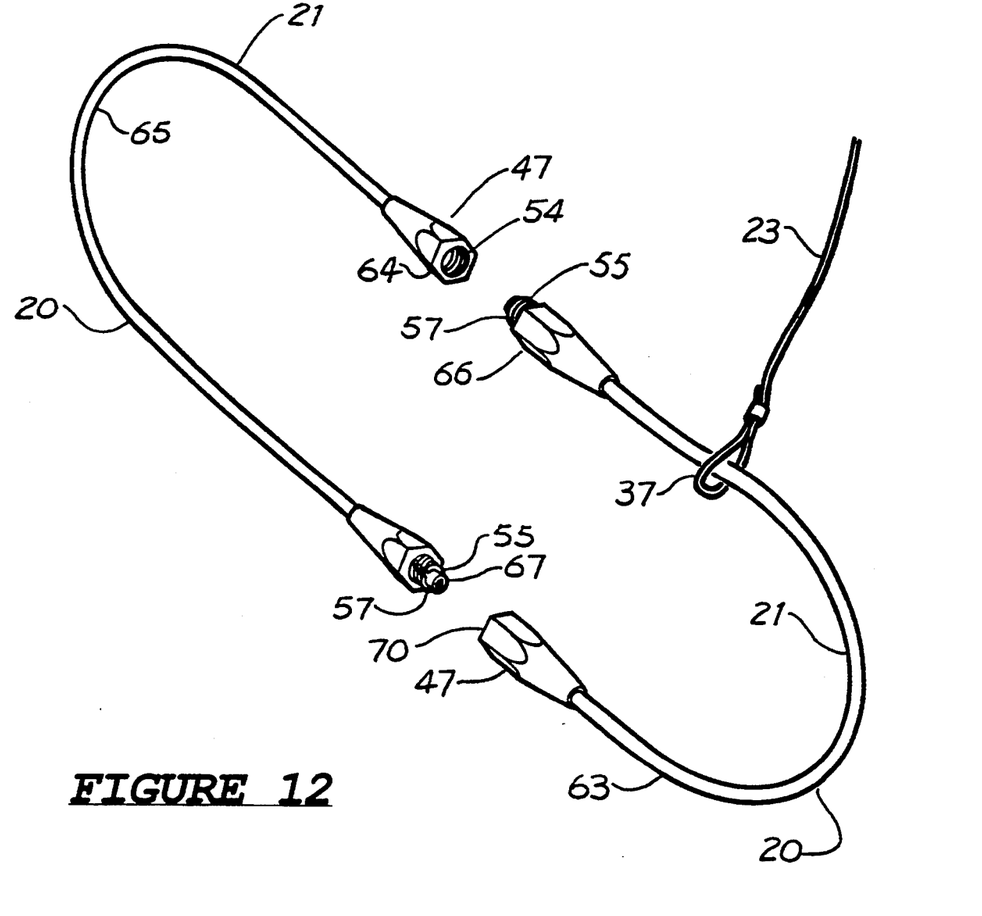
FIG. 12 is a perspective view of the preferred embodiment as a modular system wherein two cable portions are shown unconnected.

Should the periphery of the path be longer than the original line length, two or more cable lines would be used as depicted in FIG. 12. In this case, the first line (63) would be left untruncated, the first end (64) of the second line (65) would be positioned end-to-end against the second end (66) of the first line, and the second end (67) of the second line would be truncated, as before described, to the length whereby it meets the first end (70) of the first line.

Figure 13:
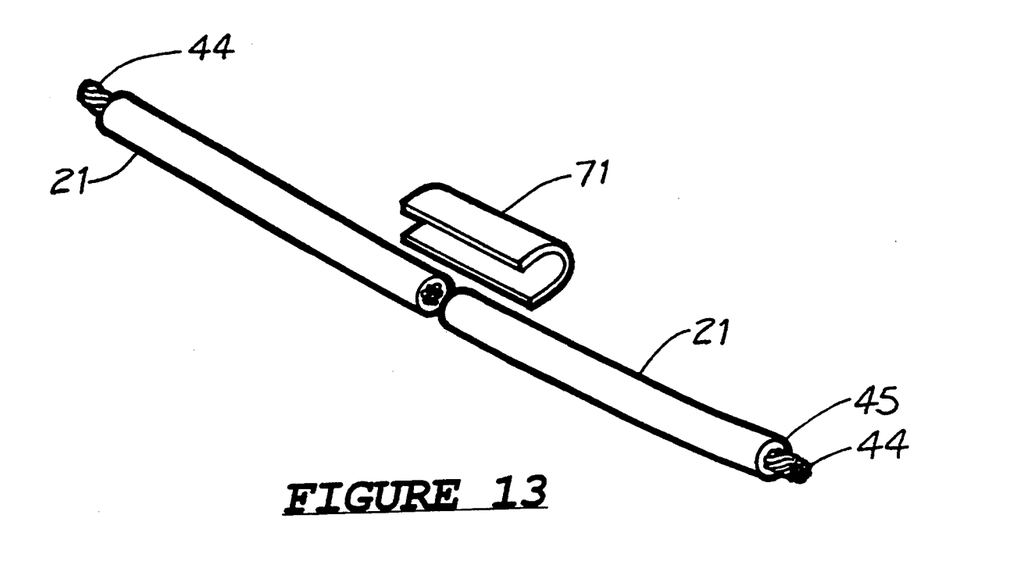
FIG. 13 is an exploded partial perspective view of the connector components of an alternate embodiment of the invention.
Figure 14:
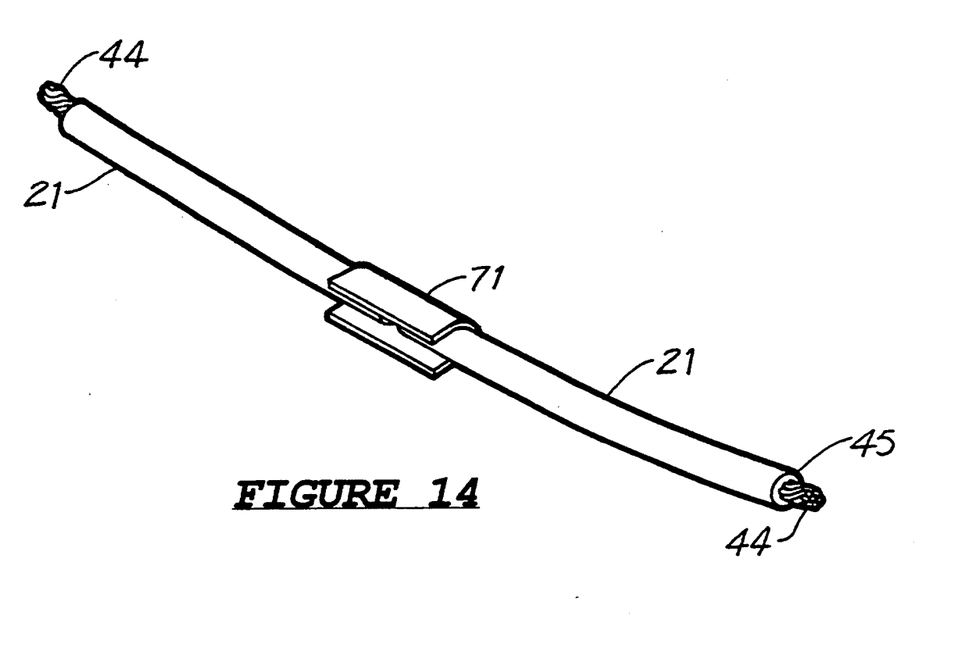
FIG. 14 is a partial perspective view of the connector components of FIG. 13.
Figure 15:
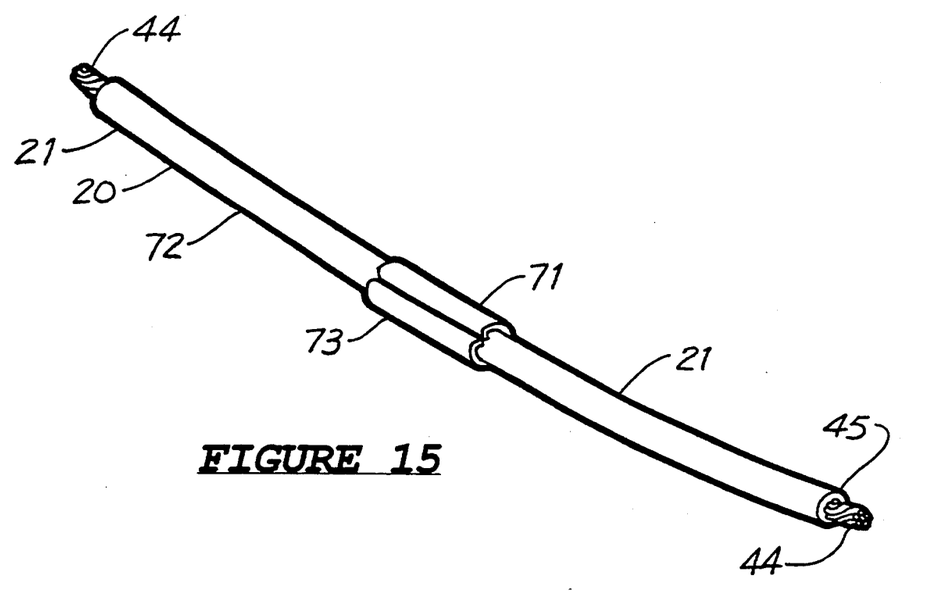
FIG. 15 is a partial perspective view of the crimped connector assembly of FIG. 13.

In a simplified embodiment of the invention, depicted in FIGS. 13 through 15, the cable would be truncated so that both ends meet end-to-end. A single sheet metal crimp connector (71) would be fitted over both ends of the cable and crimped to assemble the cable loop (72). Although this embodiment has the advantage of reduced cost over the preferred embodiment, the connection (73) is permanent, and cannot be easily disassembled for movement to a new location or for storage as can the preferred embodiment.

Figure 16:
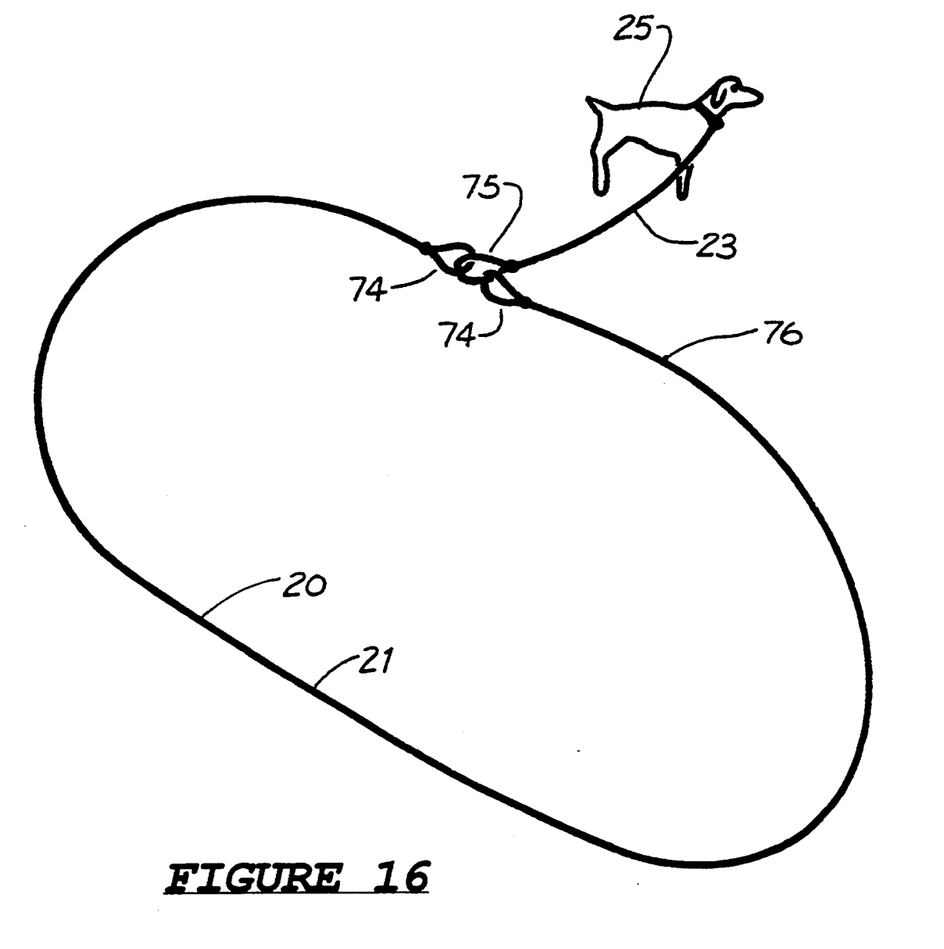
FIG. 16 is a perspective view of an embodiment of the invention wherein the leash portion is fixedly attached to the cable ends.

In another alternate embodiment of the invention, depicted in FIG. 16, the cable ends (74) and the leash loop (75) are fixedly connected. As the pet encircles the home, the entire cable loop (76) is dragged around the home (not shown) also.

Those skilled in the art will recognize that there are many variations of the invention and that the invention is to be limited only by the following claims and the equivalents to which the various elements thereof are entitled.

What I claim is:

1. A device for guiding a pet around a continuous-loop path, adaptable to paths of various lengths, and comprising:

a cable portion having pre-assembly and post-assembly states, and including:

a flexible linear cable having first and second ends;

first and second connectors, said first connector engaging said cable toward said first end and adapted to move freely longitudinally therealong during said pre-assembly state, and said second connector engaging said cable adjacent said second end, said connectors being adapted for connection to each other during said post-assembly state to align, abut, and secure cable ends therein and to form a connection assembly, said connectors being separated along said cable by a variable distance during said pre-assembly state, a leash portion having a first leash end engaging said cable and adapted to move freely longitudinally therealong and freely over said connection assembly during said post-assembly state, and a second leash end removably attachable to said pet;

wherein, during said pre-assembly state said variable distance of separation along said cable may be shortened, by moving said first connector longitudinally towards said second connector, to substantially equal the length of said continuous-loop path, and truncation of extending cable between the first connector and the first cable end may provide a truncated cable length substantially equal to said continuous-loop path length, such that assembly of said connectors may align, abut and secure said second and truncated cable ends and thereby form a continuous loop along said continuous-loop path and provide a continuous-loop guide for said pet when said pet is attached to said second leash end.

2. A method of installing a continuous-loop pet guiding system, the system comprising:

a flexible linear cable having first and second ends;

first and second connectors, said first connector engaging said cable toward said first end and adapted to move freely longitudinally therealong and said second connector engaging said cable adjacent said second end, said connectors being adapted for connection to each other to thereby form a connection assembly, said, connection assembly being adapted to secure, align and abut cable ends therein;

a leash portion having a first leash end engaging said cable and adapted to move freely longitudinally therealong and freely over said connection assembly, and a second leash end removably attachable to a pet;

wherein the method comprises:

placing the cable along a continuous-loop path such that the ends thereof overlap;

moving said first connector longitudinally along said cable toward said second connector such that the first and second connectors are substantially adjacent to each other;

truncating the overlapping portion of the cable that extends from the first connector to the first cable end, thereby forming a truncated cable end; and connecting said first and second connectors to form said connection assembly such that said second and truncated cable ends are fixedly secured therein and substantially aligned and abutted, and said cable thereby forms a continuous-loop along said continuous-loop path;

and whereby said pet, when attached to said second leash end, may pull said leash along said cable, over said connection assembly, and around said continuous-loop path.

* * * * *